United States Patent [19]

Evans

[11] 4,423,592
[45] Jan. 3, 1984

[54] FUEL CONTROL SYSTEM FOR GAS TURBINE ENGINE

[75] Inventor: Rowland M. Evans, Terrasse Vaudreuil, Canada

[73] Assignee: Aviation Electric Ltd., Montreal, Canada

[21] Appl. No.: 210,938

[22] Filed: Nov. 28, 1980

[51] Int. Cl.³ ............................ F02C 3/10; F02C 9/28
[52] U.S. Cl. ................................ 60/39.161; 60/39.281
[58] Field of Search .......................... 60/39.161, 39.281

[56] References Cited

U.S. PATENT DOCUMENTS

| | | |
|---|---|---|
| 3,006,144 | 10/1961 | Arnett et al. . |
| 3,152,444 | 10/1964 | Peczkowski et al. . |
| 3,393,691 | 7/1968 | Longstreet et al. . |
| 3,587,229 | 6/1971 | Peczkowski . |
| 3,832,846 | 9/1974 | Leeson . |
| 3,888,078 | 6/1975 | Greune et al. . |
| 3,936,226 | 2/1976 | Harner et al. ..................... 60/39.281 |
| 3,956,884 | 5/1976 | Eves .................................. 60/39.281 |
| 4,018,044 | 4/1977 | Joby et al. . |
| 4,040,250 | 8/1977 | Saunders et al. . |
| 4,045,955 | 9/1977 | Brannstrom et al. . |
| 4,100,731 | 7/1978 | Janes et al. . |
| 4,134,257 | 1/1979 | Riple . |
| 4,171,613 | 10/1979 | Schmidt-Roedenbeck et al. . |
| 4,188,781 | 2/1980 | Johnson et al. . |

OTHER PUBLICATIONS

"SD Series" Controls for Aero-Engines, D. A. Caine, Nov. 1975.
Digital Control for Helicopter Powerplants, D. A. Caine & S. Janik, Nov. 1979.
NDEC, A Control Concept for Helicopter Gas Turbines, D. J. Hawes & R. M. Evans, May, 1980.

*Primary Examiner*—Louis J. Casaregola
*Attorney, Agent, or Firm*—Anthony F. Cuoco; William A. Marvin

[57] ABSTRACT

A fuel control system (11) for a gas turbine engine (10) is disclosed. The proportional control regulates the fuel flow Wf from a hydromechanical unit (36) based upon an error signal E representing the difference between a demanded speed signal Nd and an actual speed signal Ng. The demanded speed signal Nd is generated by an integrator (32) as the time integral of the difference between the demanded signal Nd and a scheduled speed signal Ngs. Additionally, the difference signal is limited between an upper limit Al and a lower limit Dl prior to the integration by a comparator (28) and limited circuit (30).

15 Claims, 4 Drawing Figures

FUEL CONTROL SYSTEM FOR GAS TURBINE ENGINE

BACKGROUND OF THE INVENTION

The invention relates to a fuel control system for a gas turbine engine.

For the improved fuel control of gas turbine engines it is known to use a closed loop govenor based on the speed of the turbine rotor. Proportional governing is introduced in these controls by differencing the actual speed of the turbine and a demanded or scheduled speed. The error signal developed by differencing these parameters is multiplied by a gain and thereafter used to control fuel flow to change turbine speed in a direction tending to null the error. A pure proportional type of control, however, produces a steady state or permanent error between the actual and desired speeds which increases with turbine speed. This permanent error or "droop" is indicative of the steady state fuel flow at the quiescent operating points of the controller. Although the error is inversely proportional to the gain of the proportional loop, it can only be truly nulled with a loop of infinite gain. However, increasing the gain of a proportional loop to where the "droop" error becomes acceptable can result in instability and loss of control of speed for the gas turbine engine.

To overcome this problem, isochronous governors for gas turbine engines have been proposed where the permanent error signal is integrated to zero without producing instability in the proportional loop. The deviation or "droop" error between the scheduled and actual speed signals can then be effectively nulled in this manner. Implementation of the technique comprises an integral loop in parallel with the proportional loop. The integral loop includes an integrator for generating the time integral of the difference between the scheduled speed and the actual speed. In this manner the integrator output yields a datum to which the proportional loop can be slaved by differencing it with the actual speed. Thus, it is the difference between the datum and the actual speed which generates the permanent error signal and steady state fuel control value. In this type of system the actual speed becomes slaved to the datum and changes proportionally according to the loop gain with changes in the datum.

When the controlling parameter of a slave-datum system is a scheduled speed, the deviation input to the integral loop is an acceleration term since the time integral of acceleration is velocity. The system is closed loop on acceleration where the magnitude of the difference between the scheduled speed and the actual speed is indicative of a scheduled acceleration. The actual acceleration of the engine is fed back through the changes in the actual speed signal to close the loop. It is evident that acceleration limiting of the gas turbine engine can be accomplished in a facile manner by regulating the acceleration term before it is input to the integrator.

Although this type of isochronous system provides the advantages of being able to null the droop of the governor and limit acceleration it does have one disadvantage. The system response to changing transient conditions is regulated by the response of the gas turbine engine to those conditions. Before the error caused by a change in operating conditions or a scheduled acceleration can be integrated to a nullity, the engine must actually change speed an amount equal to the error. Therefore, changes in the datum to which the proportional loop is slaved are dependent upon the inertial lag of the engine. It would be highly desirable to remove this inertial time delay from the integral loop.

It has now been determined that the actual turbine speed will proportionally follow the demanded speed signal or datum by the inertial lag of the engine and thus it can be assumed that the demanded speed signal contains useful information about the anticipated rate of change of actual turbine speed. This assumption is reliably based on the premise that the engine response characteristic is known and it will change speed as commanded by the demanded speed signal. An anticipatory estimate of that rate of change of actual speed can be obtained by comparing the scheduled speed signal to be demanded speed signal to generate the acceleration term, thus removing the engine lag from the integral loop calculation.

SUMMARY OF THE INVENTION

The invention is an improved closed loop fuel control system for gas turbine engines. The invention comprises a proportional loop which differences a demanded speed signal (datum) and an actual speed signal and an integral loop which integrates an acceleration term to yield the demanded speed signal. The proportional loop is slaved to the demanded speed signal to generate an error signal which controls fuel flow of the engine in a direction tending to null the acceleration term. The acceleration term is integrated to zero for steady state conditions by the integral loop. The acceleration term instead of being formed in the normal manner is formed by differencing a scheduled speed signal and the demanded speed signal. This system is closed loop on acceleration because the rate of change of the demanded speed signal is utilized as an anticipatory estimate of actual acceleration. Therefore, the acceleration term will lead the actual acceleration as the demanded speed signal leads the actual speed signal.

By comparing the scheduled speed signal to the demanded speed signal a higher proportional loop gain may be used in the gas turbine engine fuel control without producing instability. This is because the demanded signal anticipates the steady state value to which the engine is accelerating and does not overshoot this value. Therefore, the actual engine speed which proportionally follows the demanded speed signal by the inertial lag of the engine will also begin decelerating before it reaches its steady state value. The gain of the proportional loop can be increased because the datum is reduced automatically upon nearing the steady state value and will not cause the slaved actual speed to overshoot the value.

In a preferred embodiment the improved fuel control is used in conjunction with a hydromechanical unit that regulates fuel flow proportionally in dependence on the error signal. The error signal is generated by the control as a function of Wf/Pc where Wf is fuel flow and Pc is compressor pressure. The hydromechanical unit receives the error signal in term of the fuel/air ratio and mechanically multiplies the signal by a parameter based on compressor pressure to modulate fuel flow to the engine.

In the preferred embodiment the acceleration term is also limited prior to integration by an acceleration and deceleration limit based upon the surge line of the particular engine. This configuration is particularly advantageous in that for transient response the integrator can be set on limit until the acceleration term is reduced to below the limit, whereafter the demanded speed signal can smoothly approach the desired steady state value in a controlled manner. In spite of wherever the original transient begins or its size, this feature produces the same final behavior from the engine. Thus, the final transition from the acceleration schedule to a steady state value can be tailored to bring the system into equilibrium in an optimum amount of time without overshoot.

Another feature of the invention provides that the scheduled speed term is generated by a speed scheduling circuit as a function of the demanded output power of the gas turbine engine. In one preferred implementation the speed scheduling circuit is a free turbine speed governor for a shaft turbine engine. In a second preferred implementation the speed scheduling circuit governs the substantially constant rotor speed of a helicopter rotor with respect to a reference speed. The output power of the shaft turbine engine in the second implementation is controlled by the operator as a function of the collective pitch angle of the rotor.

These and other objects, features, and aspects of the invention will be better understood and more clearly explained if a reading of the detailed disclosure is undertaken in conjunction with the appended drawings, wherein:

DETAILED DESCRIPTION OF THE PREFERRED EMBODIMENTS

Figure 1:
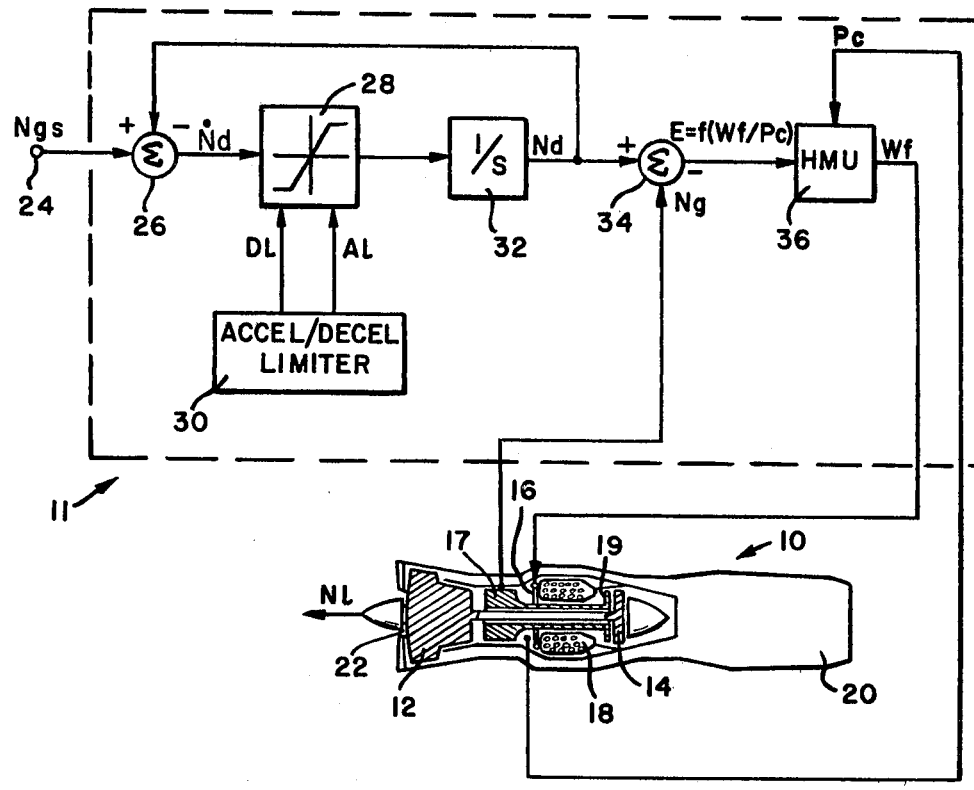
FIG. 1 is a system block diagrammatic view of a fuel control system for a turbojet engine which is constructed in accordance with the teachings of the invention.

With reference to FIG. 1 there is shown a fuel control system 11 for a turbojet engine which is generally designated 10. The engine 10 includes an intake duct 22 through which air enters. After entering the engine, the air is compressed by a low pressure compressor 12 and subsequently by a high pressure compressor 17. Compressors 12 and 17 are of the axial type which produce an increase in pressure and consequently, an increase in the density of the incoming air proportional to their speed. The denser air moves to a fuel supply section where a fuel ring 16 produces a combustible fuel/air mixture by spraying fuel into the incoming stream. The fuel/air mixture is thereafter ignited and combusted in burners 18 to produce a high velocity exhaust gas. The exhaust gas, as is conventional in this type of reaction engine, exits through a nozzle 20 to produce a forward thrust. A portion of the energy contained in the exhaust gas is expended in rotating a low pressure turbine 14 and a high pressure turbine 19 which are physically attached to the respective compressors by concentrically disposed rotor shafts. Each compressor and turbine combination form a spool which rotates independently from the other. The engine described is a conventional two-spool turbojet engine in which the second or low pressure spool has been added to increase the efficiency of the engine.

Generally, the control of the turbine speed and thus, output power or thrust of the engine is regulated by the amount of fuel flowing through the fuel ring 16. This fuel flow Wf is modulated by the fuel control to provide more or less energy and thus, reaction power from the engine. Increasing the fuel flow increases the engine speed and output power while decreasing the fuel flow decreases engine speed and output power.

The fuel control system 11 is provided for assuring that control of the engine speed is maintained during steady state operation, accelerations, and decelerations. The fuel control illustrated is based on an input to terminal 24 which is the desired or scheduled rotational speed Ngs, of one of the compressor and turbine combinations of the engine 10. The signal Ngs can, for example, be generated as the output from a schedule based on the power lever angle of the particular device the engine is used on. In its simplest form the Ngs signal can be generated from a potentiometer that is ganged to the power lever.

When referring to the engine speed, either the high pressure compressor speed Ng of the low pressure compressor speed N1 is meant because either can be used to control the engine. In this particular embodiment the controlling parameter of the fuel control will be the high spool speed Ng. The high spool speed is the controlling parameter in this type of engine since it is the more critical to the operation.

By scheduling the commanded speed Ngs to terminal 24 any desired engine power may be obtained since the fuel control varies the power of the gas turbine engine by regulating engine speed. Thus, the control system operates to govern the engine speed as a function of the scheduled speed Ngs and accelerates or decelerates the engine in a manner to reach a new scheduled speed when the pilot or another system component changes the scheduled engine speed. Otherwise, for changes in engine environment, such as altitude, temperature, pressure, or other factors, the governor acts to maintain the scheduled speed Ngs.

To control acceleration or deceleration, the controller forms an acceleration term which is the difference between the scheduled speed Ngs and a demanded speed term Nd. This function is performed by feeding the two parameters to a first summing junction 26 and generating a difference signal of sign and magnitude equivalent to the difference therebetween. The acceleration term or difference signal is integrated in an integrator 32 to become the demanded speed signal Nd. This portion of the control forms an integral loop providing a datum which is the demanded speed signal Nd.

The acceleration term is conventionally limited by a comparator circuit 28. The comparator 28 compares the acceleration term to an upper limit A1 and a lower limit D1 and pases the acceleration term unmodified if between the two values. However, if the demanded acceleration is greater than that defined by the current operating conditions, the acceleration term will be limited at the upper acceleration limit A1, while if the demanded deceleration is greater than that defined by the current operating conditions it will be limited at the lower deceleration limit D1. An acceleration/deceleration limiter circuit 30 is used to generate the variable limits and to modify the limits as a function of the operating parameters of the engine as is conventional in the art. An acceleration limit schedule is stored in a memory device of the circuit where the schedule is substantially equivalent to the surge line of the particular engine expressed as a function of the engine operating paramters chosen. The surge line can be expressed as any of a number of different parameters indicating steady state values of fuel/air ratio, or acceleration ratios.

Thereafter, the demanded speed signal Nd is differenced with the high spool speed of the turbine Ng in a second summing circuit 34. The error signal E generated by this difference is then used to proportionally control the fuel flow to the engine 10 in a direction tending to null the error between the scheduled speed signal Ngs and the demanded speed signal Nd. In this manner this portion of the controller forms a proportional control loop slaved to the datum Nd. For changes in the datum Nd the actual engine speed Ng will change to where there is a steady state error E supporting that particular demanded speed.

The proportional control is developed by a hydromechanical unit (HMU) 36 which receives as an input the error signal E. The HMU 36 multiplies the error signal E by a predetermined gain to provide a fuel flow Wf which is proportional to the error signal. In its simplest form, if the error signal E is electrical, the HMU could be implemented as a proportional solenoid valve which changes position with respect to a control voltage representative of the error signal to regulate fuel flow from a pressurized fuel source. The HMU 36 would, therefore, also consist of a pressure regulator and a pressurized source of fuel (not shown) as is conventionally known in the art.

Additionally, the HMU 36 can include means for mechanically multiplying the error signal E by an input representative of the output of the compressor stages, compressor pressure Pc. In combination with the proportional solenoid, the multiplying means could comprise a multiplying piston coupled to the fuel valve which transduces the compressor pressure Pc into a force to assist the solenoid. Thus, the error signal E at all engine operating points is proportional to Wf/Pc or the fuel/air ratio of the engine. Because of this mechanical multiplication, the error signal E can be thought of as being generated as a function of the fuel/air ratio of the engine. Normally, this would make the scheduling of the speed signal Ngs much easier to implement.

Figure 3:
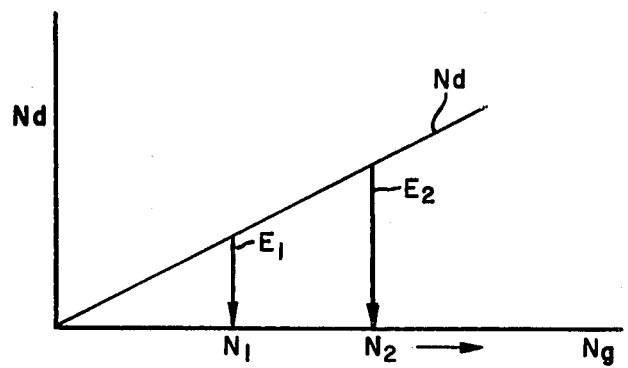
FIG. 3 is a graphical representation of the steady state values of the demanded speed signal and the actual speed signal as a function of quiescent turbine speed for the fuel control system illustrated in FIG. 1.

The governing response of the fuel control system will now be more fully explained with respect to FIG. 3. Illustrated is a curve that represents the steady state values of Nd for all values of steady state speed Nd. The curve Nd is linear and monotonic with a predetermined slope. A slope on the Nd curve generates greater error signal values E for increases in speed. For example, E2 is greater than E1 where N2 is greater than N1. This is to be expected where the steady state fuel flow must increase for adjustments in engine speed to maintain equilibrium.

To accelerate the engine from N1, the signal Nd is controlled by the integrator to increase above its steady state value thereby increasing the error signal above its steady state value. The amount of overfueling produced by the increase in the error signal is proportional to the acceleration of the engine. As the engine increases speed due to the overfueling, the Ng signal will increase to where it reduces the error signal to a new equilibrium value E2. Conversely, reducing the error signal below its steady state value by decreasing the Nd signal will cause an underfueling and a consequent deceleration of the engine from N2. The engine will decelerate until the Ng signal decreases to where the error signal E1 is again in equilibrium between the two values.

It is evident that the Ng signal, and thus the actual speed of the turbine, follows the Nd signal proportionally with a lag based on the inertial response of the engine to the increases and decreases in fuel flow. Therefore, the actual speed of the rotor can be controlled by using the Nd signal as an anticipatory or implied actual speed signal to govern engine performance.

Figure 4:
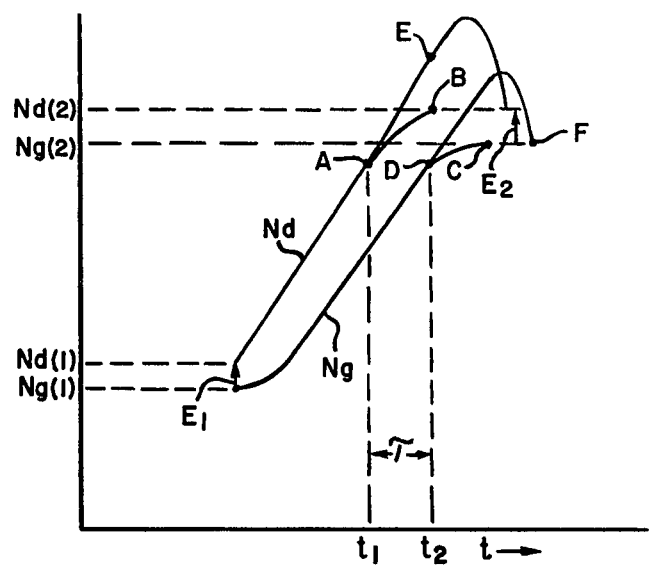
FIG. 4 is a time trace comparison of the demanded speed signal and actual speed signal for the system disclosed in FIG. 1 and a prior art system.

For an appreciation of the improvement in system performance by using the Nd signal as an anticipatory feedback, FIG. 4 will now be explained in conjunction with certain aspects of FIG. 3. FIG. 4 illustrates the time traces of a transient response to an acceleration request for a closed loop system based on acceleration where in one instance the acceleration term is based on actual rotor speed and in the other instance the acceleration is based on demanded rotor speed. In other words, the controller illustrated in FIG. 1 will be compared to the prior art slave datum controller. The two traces indicate the relationship of Nd and Ng on a time base for a transient that produces an acceleration to move the actual speed of the turbine from Ng(1) to Ng(2). Of course, this will require a change in demanded speed from Nd(1) to Nd(2). This change in turbine speed corresponds to a change in steady state conditions from N1 to N2 in FIG. 3 and thus E1 and E2 are identical for both Figures.

Now assume the scheduled rotor speed Ngs is changed in a stepwise fashion from a value corresponding to Ng(1) to a value corresponding to Ng(2). The integrator will begin integrating the difference between Ngs and Nd in the present system and the difference between Ngs and Ng in the prior art system. The systems will continue to change fuel flow until the differences are integrated to zero, i.e., until Ngs=Nd in the present system and Ngs=Ng in the prior art system.

It is reasonable to predict a large scale transient representing a relatively large difference signal will transfer both systems to a limiting acceleration value. While on the acceleration limit the Nd signal will increase according to a predetermined slope set by the limit and the Ng signal will follow it by its inertial time lag. It is assumed that the operating conditions input to the limiter circuit 32 remain constant so that the acceleration limit does not vary during this time.

The system will continue to accelerate at the limit value until the difference signal or acceleration term is reduced below the limit value. At that time, point A in the drawing, the demanded speed signal Nd will begin to show its increase as the integrator begins integrating smaller difference signals. When the demanded speed signal reaches point B, it equals the Ngs signal and the integrator thus holds it constant since the difference signal is now zero. This is prior to the actual speed signal Ng reaching its steady state value. The system subsequently comes into equilibrium when the actual speed signal Ng proportionally following the demanded speed signal Nd reaches point C an inertial time delay later.

This system thus provides a rapid but smooth transition for a change in speed from Ng(1) to Ng(2). It is noted that the actual speed signal Ng slows before it reaches Ng(2) so that no overshoot is produced. When transitioning from the acceleration limit the system response is similar for large and small transient conditions because the Nd signal will always perform in an identical manner near the equilibrium value.

The normal slave datum system, however, when point A is reached continues to accelerate to point D where the difference between the actual spaced signal Ng and the scheduled speed signal Ngs is less than the acceleration limit. Since there is a lag in the response of the Ng signal to the Nd signal, the system does not recognize until this point that it should lower the acceleration to a smaller amount. Consequently, the Nd signal does not stop demanding an increase in acceleration until at point E one time delay later than the present system. By that time, the Nd signal which has demanded more overfueling than necessary pulls the Ng signal past the scheduled Ngs signal and requires a deceleration cycle to be generated until the system finally settles at point F.

Depending upon the inertial lag of the engine and the proportional time constant (gain) of the system this response may not only overshoot the steady state value, but also be oscillatory. The only way to control this oscillatory transient response is to decrease the proportional gain. This, however, produces a more sluggish system that does not respond optimally to transients. Therefore, it has been shown that the use of the demanded speed signal to generate an implied acceleration term may be used to increase response to transients while maintaining loop stability in the gas turbine engine fuel controller.

Figure 2:
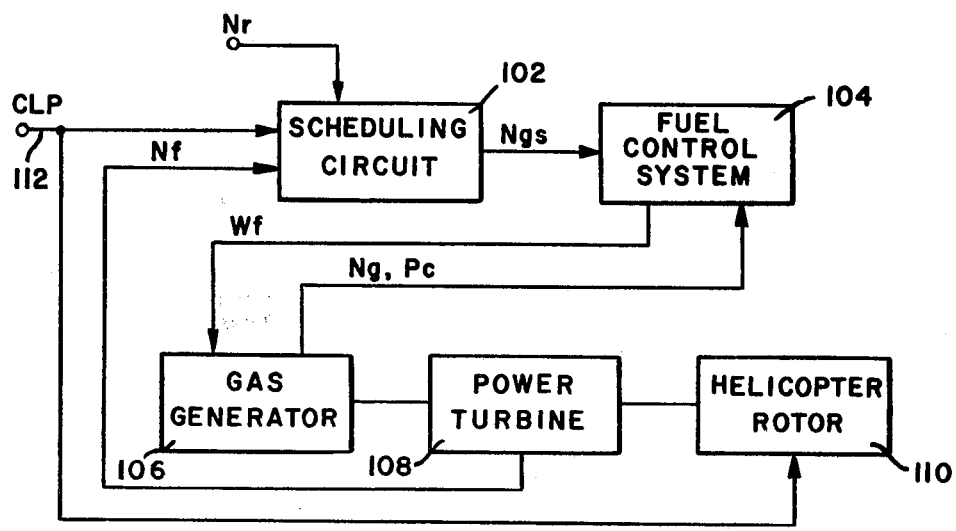
FIG. 2 is a block diagrammatic view of the fuel control system illustrated in FIG. 1 in an embodiment suitable for a shaft turbine engine.

The fuel control system that has just been described was shown in FIG. 1 implemented as specifically applicable to a turbojet engine. This fuel control system is just as advantageous in the control of a free turbine engine as will now be more fully pointed out with reference to FIG. 2. In that Figure, a fuel control system 104 is shown as receiving a scheduled speed signal Ngs, an actual speed signal Ng, and a pressure signal Pc, and generating a fuel flow signal Wf therefrom. The components comprising fuel control system 104 are identical to that described for the system 11 of FIG. 1.

However, in this implementation the signal Wf controls a gas generator 106 for a free turbine engine. The gas generator 106 contains similar components to the turbojet engine including a compressor, a fuel ring, a burner section, and a turbine. However, instead of using the high velocity gas in a reaction generator, the high energy gas is used to turn a power turbine 108 of the free turbine engine. It will be appreciated that the power turbine can be connected to any type of load normally powered by a free turbine engine.

When the invention is utilized in this manner the scheduled speed signal Ngs, which is a measure of the output power of the gas generator, can be scheduled by a scheduling circuit 102. Advantageous circuits for generating the scheduled speed of the gas generator when the invention controls a free turbine engine can take many forms.

In one specific implementation, the scheduling circuit 102 can have an input signal Nf from the power turbine which indicates the rotational speed thereof. The implementation can also have a variable reference signal Nr which is representative of the desired speed of the power turbine 108 input to the schedulig circuit 102. A proportional control loop can be formed by differencing the signals Nr and Nf generating the signal Ngs proportionally to the error produced therefrom. Thus, the scheduling circuit can be a free turbine speed governor providing a reset signal to a gas generator speed governor, fuel control system 104.

In another more specific implementation, the power turbine 108 can be connected through suitable gearing or a transmission to a helicopter rotor 110. The scheduling circuit 102 in this implementation would comprise a power turbine speed governor which maintains the free turbine speed against the reference signal Nr as previously described. However, since it is desired that the rotor 110 maintain a substantially constant speed, in this instance the Nr signal will be a substantially constant value. An additional input to govern the output power of the gas generator can be a signal CLP indicative of the collective pitch angle of the rotor. This signal will therefore be representative of the desired output power of the engine as demanded by a pilot while maintaining rotor speed constant.

While a detailed description of the preferred embodiments has been disclosed, it will be obvious to those skilled in the art that various modifications and changes may be made thereto without departing from the spirit and scope of the invention as is hereinafter defined in the appended claims.

What is claimed is:

1. A fuel control system for a gas tubine engine comprising:
   means for generating an actual speed signal proportional to the actual turbine speed of the gas turbine engine;
   means for generating a scheduled speed signal proportional to a desired engine output power;
   means for generating a demanded speed signal proportional to the time integral of a difference signal;
   means for generating said difference signal proportional to the difference between said scheduled speed signal and said demanded speed signal;
   means for generating an error signal proportional to the difference between said demanded speed signal and said actual speed signal; and
   means for controlling the fuel flow to the gas turbine engine as a function of said error signal.

2. A fuel control system as defined in claim 1, further including:
   means for limiting said difference signal before integration by said demanded signal generating means between an upper limit and a lower limit.

3. A fuel control system as defined in claim 2 wherein:
   said upper limit is variable.

4. A fuel control system as defined in claim 3 wherein:
   said lower limit is variable.

5. A fuel control system as defined in claim 1, wherein:
   said error signal is generated as a function of Wf/Pc where Wf is the fuel flow delivered to the engine; and
   Pc is the compressor output pressure.

6. A fuel control system as defined in claim 5, wherein said fuel controlling means includes:
   means for multiplying said error signal by said pressure signal to yield the fuel flow input to the engine.

7. A fuel control system for a gas turbine engine of the free turbine type having a gas generator and a power turbine, characterized by:

means for generating an actual speed signal proportional to the actual turbine speed of the gas generator of the engine;

means for generating a scheduled speed signal proportional to the desired output power of the power turbine of the engine;

means for generating a demanded speed signal proportional to the time integral of a difference signal;

means for generating said difference signal proportional to the difference between said scheduled speed signal and said demanded speed signal;

means for generating an error signal proportional to the difference between said demanded speed signal and said actual speed signal; and means for controlling the fuel flow to the gas generator of the free turbine engine as a function of said error signal.

8. A fuel control system as defined in claim 7, further including:

means for limiting said difference signal before integration by said demanded signal generating means between an upper limit and a lower limit.

9. A fuel control system as defined in claim 8, wherein:

said upper limit is variable.

10. A fuel control system as defined in claim 9, wherein:

said lower limit is variable.

11. A fuel control system as defined in claim 10, wherein:

said error signal is generated as a function of Wf/Pc where Wf is the fuel flow delivered to the engine; and Pc is the compressor output pressure.

12. A fuel control system as defined in claim 11, wherein said fuel controlling means includes:

means for multiplying said error signal by said pressure signal to yield the fuel flow input to the engine.

13. A fuel control system as defined in claim 7 wherein:

said power turbine operably powers a rotor of a helicopter.

14. A fuel control system defined in claim 13, wherein:

said rotor speed is substantially constant and wherein said desired output power is demanded as a function of the pitch angle of the rotor.

15. A fuel control system for a gas turbine engine including an integrator for generating a demanded speed signal which is proportional to the time integral of an acceleration term; means for generating an error signal proportional to the difference between the demanded speed signal and an actual speed signal indicative of the actual speed of the engine; and means for controlling the fuel flow to the engine as a function of said error signal; said fuel control system characterized by:

means for generating said acceleration term as the difference between said demanded speed signal and a scheduled speed signal indicative of a desired engine output power.

* * * * *